(12) United States Patent
Ravinuthala et al.

(10) Patent No.: US 12,585,615 B2
(45) Date of Patent: Mar. 24, 2026

(54) SIMPLIFYING UNSTRUCTURED DATA FOR DATA ANALYTICS

(71) Applicant: State Farm Mutual Automobile Insurance Company, Bloomington, IL (US)

(72) Inventors: Satya Ravinuthala, Normal, IL (US); Suresh Kumar Alluri, Secunderabad (IN)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/597,638

(22) Filed: Mar. 6, 2024

(65) Prior Publication Data

US 2025/0231908 A1    Jul. 17, 2025

Related U.S. Application Data

(60) Provisional application No. 63/620,007, filed on Jan. 11, 2024.

(51) Int. Cl.
*G06F 16/11* (2019.01)
*G06F 16/174* (2019.01)

(52) U.S. Cl.
CPC ........ *G06F 16/116* (2019.01); *G06F 16/1748* (2019.01)

(58) Field of Classification Search
CPC ............................ G06F 16/116; G06F 16/1748

(Continued)

(56) References Cited

U.S. PATENT DOCUMENTS

| | | | |
|---|---|---|---|
| 9,830,319 B1 * | 11/2017 | Tortosa | G06F 16/86 |
| 10,825,449 B1 * | 11/2020 | Chinnalagu | G06F 16/353 |

(Continued)

FOREIGN PATENT DOCUMENTS

| | | | | |
|---|---|---|---|---|
| CN | 106453971 A * | 2/2017 | ......... | G06F 16/3331 |
| DE | 112012007039 T5 * | 8/2015 | .......... | G06F 11/1453 |

(Continued)

OTHER PUBLICATIONS

Clean-text python library, <<https://github.com/jfilter/clean-text>>, retrieved Mar. 6, 2024, 4 pages.

(Continued)

*Primary Examiner* — Phuong Thao Cao
(74) *Attorney, Agent, or Firm* — Lee & Hayes, P.C.

(57) ABSTRACT

A computer-implemented method, including receiving a first file composed of unstructured data with a first file format; applying one or more programmatic solutions for identifying one or more duplicate text in the first file format wherein the one or more duplicate text are associated with one or more attributes contained in unstructured data of the first file; identifying duplicate text contained in the first file wherein the duplicate text is associated with at least a first attribute of the unstructured data; in response to identifying duplicate text contained in the first file format, applying a mechanism for modifying the duplicate text in the first file format to change the first attribute of the unstructured data to a second attribute of a second file format; and converting the unstructured data of the first file into a second file of structured data of the second file format composed of the second attribute.

20 Claims, 6 Drawing Sheets

(58) Field of Classification Search
USPC ......................................................... 707/692
See application file for complete search history.

(56) References Cited

U.S. PATENT DOCUMENTS

| | | | | |
|---|---|---|---|---|
| 11,573,973 | B1 * | 2/2023 | Vishnoi ................. | G06F 16/254 |
| 12,386,846 | B2 * | 8/2025 | Hasan .................... | G06N 5/022 |
| 2003/0200229 | A1 * | 10/2003 | Cazier ..................... | G06F 16/10 |
| | | | | 707/E17.031 |
| 2004/0181746 | A1 * | 9/2004 | McLure ................ | G06F 40/169 |
| | | | | 715/239 |
| 2006/0230319 | A1 * | 10/2006 | Ryali .................. | G06F 11/3684 |
| | | | | 714/38.14 |
| 2008/0127043 | A1 * | 5/2008 | Zhou ................... | G06F 11/3604 |
| | | | | 717/124 |
| 2009/0006253 | A1 * | 1/2009 | Bresnan ................. | G06Q 30/06 |
| | | | | 705/40 |
| 2014/0195891 | A1 * | 7/2014 | Venkata Radha Krishna Rao ...... | |
| | | | | G06F 40/117 |
| | | | | 715/234 |
| 2020/0302296 | A1 * | 9/2020 | Miller ..................... | G06N 20/20 |
| 2021/0004385 | A1 * | 1/2021 | Vijayalakshmi ...... | G06F 16/258 |
| 2021/0224223 | A1 * | 7/2021 | Muramoto ............ | G06F 16/116 |
| 2021/0390109 | A1 * | 12/2021 | Unni ..................... | G06F 16/254 |
| 2023/0409402 | A1 * | 12/2023 | N ......................... | G06F 11/3409 |
| 2024/0004840 | A1 * | 1/2024 | Vora .................... | G06F 16/1794 |
| 2024/0378183 | A1 * | 11/2024 | Du ...................... | G06F 16/2246 |
| 2024/0386005 | A1 * | 11/2024 | Oshin .................... | G06F 16/221 |
| 2025/0005001 | A1 * | 1/2025 | Fränzel ................. | G06N 20/00 |
| 2025/0028734 | A1 * | 1/2025 | Balasubramaniyan ...................... | |
| | | | | G06F 16/258 |
| 2025/0117507 | A1 * | 4/2025 | Subramaniam ....... | G06F 16/258 |

FOREIGN PATENT DOCUMENTS

| | | | | | |
|---|---|---|---|---|---|
| EP | | 3866050 | A1 * | 8/2021 | ........ G06F 16/1794 |
| KR | | 20190104111 | A * | 9/2019 | .......... G06F 16/182 |
| KR | | 20230015776 | A * | 1/2023 | |
| WO | WO-2017177762 | A1 * | 10/2017 | | |
| WO | WO-2017188534 | A1 * | 11/2017 | ............. G06F 16/00 | |

OTHER PUBLICATIONS

How to convert JSON into a Pandas DataFrame, <<https://github. com/BindiChen/machine-learning/blob/main/data-analysis/027-pandas-convert-json/pandas-convert-json.ipynb>>, retrieved Mar. 6, 2024, 7 pages.

Python pandas remove duplicate columns—Stack Overflow, <<https:// stackoverflow.com/questions/14984119/python-pandas-remove-duplicate-columns>>, retrieved Mar. 6, 2024, 13 pages.

Renaming column names in Panda, <<https://stackoverflow.com/ questions/11346283/renaming-column-names-in-pandas>>, retrieved Mar. 6, 2024, 24 pages.

* cited by examiner

200

Duplicate Schema Data

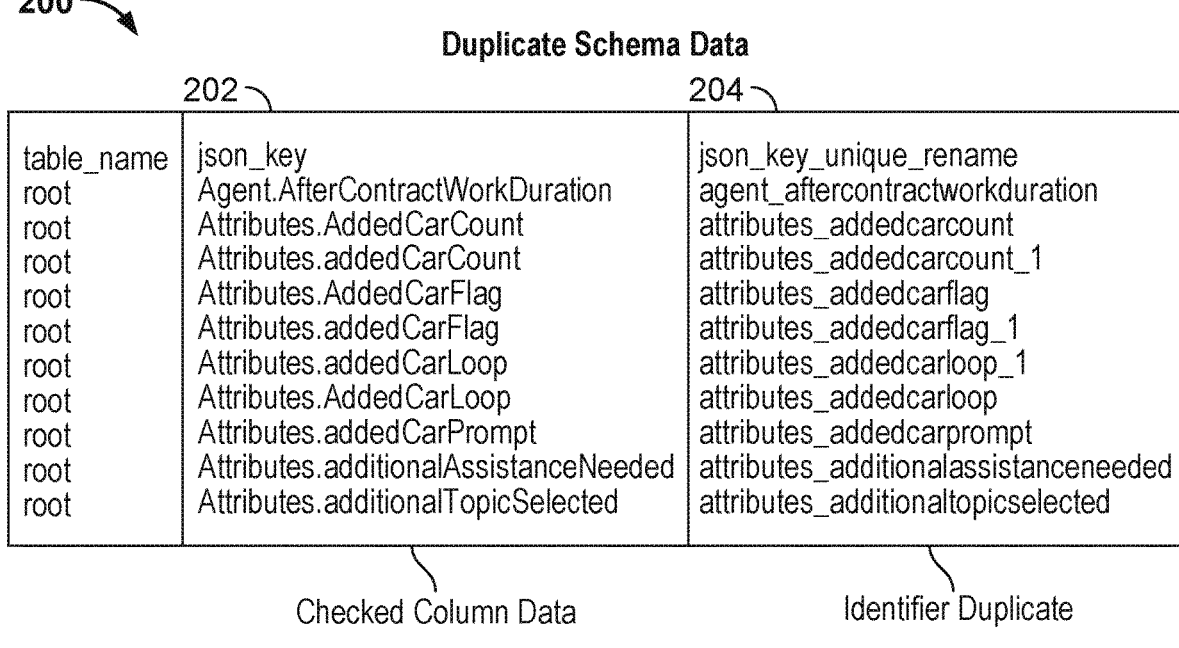

| table_name | json_key | json_key_unique_rename |
|---|---|---|
| root | Agent.AfterContractWorkDuration | agent_aftercontractworkduration |
| root | Attributes.AddedCarCount | attributes_addedcarcount |
| root | Attributes.addedCarCount | attributes_addedcarcount_1 |
| root | Attributes.AddedCarFlag | attributes_addedcarflag |
| root | Attributes.addedCarFlag | attributes_addedcarflag_1 |
| root | Attributes.addedCarLoop | attributes_addedcarloop_1 |
| root | Attributes.AddedCarLoop | attributes_addedcarloop |
| root | Attributes.addedCarPrompt | attributes_addedcarprompt |
| root | Attributes.additionalAssistanceNeeded | attributes_additionalassistanceneeded |
| root | Attributes.additionalTopicSelected | attributes_additionaltopicselected |

202      204

Checked Column Data      Identifier Duplicate

| Q *Filter job runs by property* | | | | | | | | | | < 1 2 ⚐ 4 5 6 7 ... 12 > ⬡ |
| Run status | ▼ | Retry | ▼ | Start time | ▼ | End time | ▼ | Duration | ▼ | Capacity | ▼ | Worker type | ▼ | Glue version |
|---|---|---|---|---|---|---|---|---|---|---|---|---|---|
| ○ ⊘ Succeeded | | 0 | | 06/04/2023 13:00:23 | | 06/04/2023 17:19:17 | | 4h 18m 46s | | 4 DPUs | | G.1X | | 2.0 |
| ○ ⊘ Succeeded | | 0 | | 06/03/2023 13:00:23 | | 06/03/2023 20:07:32 | | 7h 7m 2s | | 4 DPUs | | G.1X | | 2.0 |
| ○ ⊘ Succeeded | | 0 | | 06/02/2023 19:07:44 | | 06/02/2023 22:44:25 | | 3h 36m 35s | | 4 DPUs | | G.1X | | 2.0 |
| ● ⊗ Failed | | 0 | | 06/02/2023 16:22:52 | | 06/02/2023 18:05:01 | | 1h 42m 2s | | 4 DPUs | | G.1X | | 2.0 |
| ○ ⊗ Failed | | 0 | | 06/02/2023 13:00:23 | | 06/02/2023 13:40:37 | | 40m 7s | | 4 DPUs | | G.1X | | 2.0 |
| ○ ⊘ Succeeded | | 0 | | 06/01/2023 13:00:23 | | 06/01/2023 17:18:28 | | 4h 17m 58s | | 4 DPUs | | G.1X | | 2.0 |

06/02/2023 16:22:52

=

✕

⊗ SystemExit: Correct the Duplicate Columns in Schema file !!!!

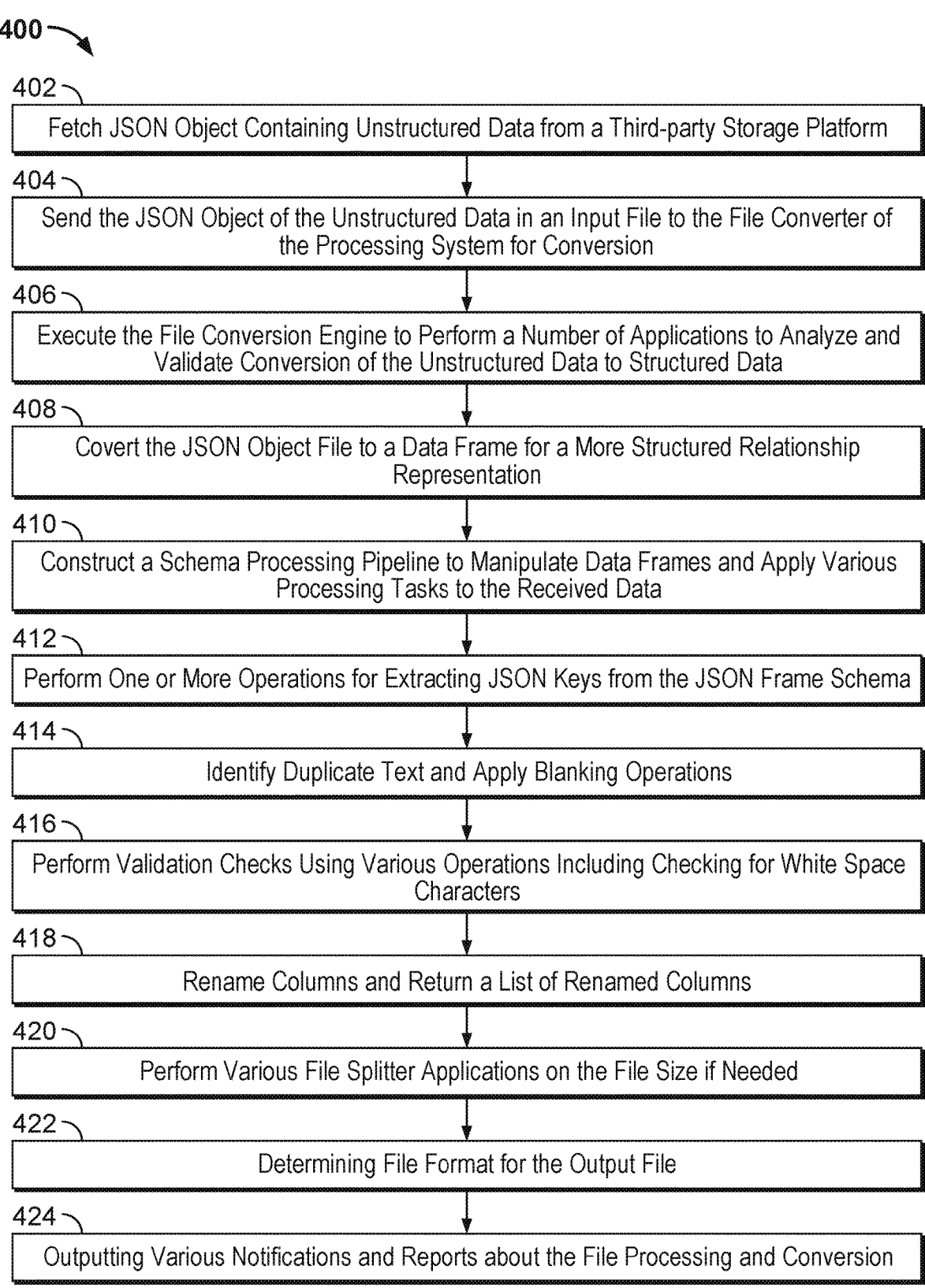

402
Fetch JSON Object Containing Unstructured Data from a Third-party Storage Platform 404
Send the JSON Object of the Unstructured Data in an Input File to the File Converter of the Processing System for Conversion 406
Execute the File Conversion Engine to Perform a Number of Applications to Analyze and Validate Conversion of the Unstructured Data to Structured Data 408
Covert the JSON Object File to a Data Frame for a More Structured Relationship Representation 410
Construct a Schema Processing Pipeline to Manipulate Data Frames and Apply Various Processing Tasks to the Received Data 412
Perform One or More Operations for Extracting JSON Keys from the JSON Frame Schema 414
Identify Duplicate Text and Apply Blanking Operations 416
Perform Validation Checks Using Various Operations Including Checking for White Space Characters 418
Rename Columns and Return a List of Renamed Columns 420
Perform Various File Splitter Applications on the File Size if Needed 422
Determining File Format for the Output File 424
Outputting Various Notifications and Reports about the File Processing and Conversion

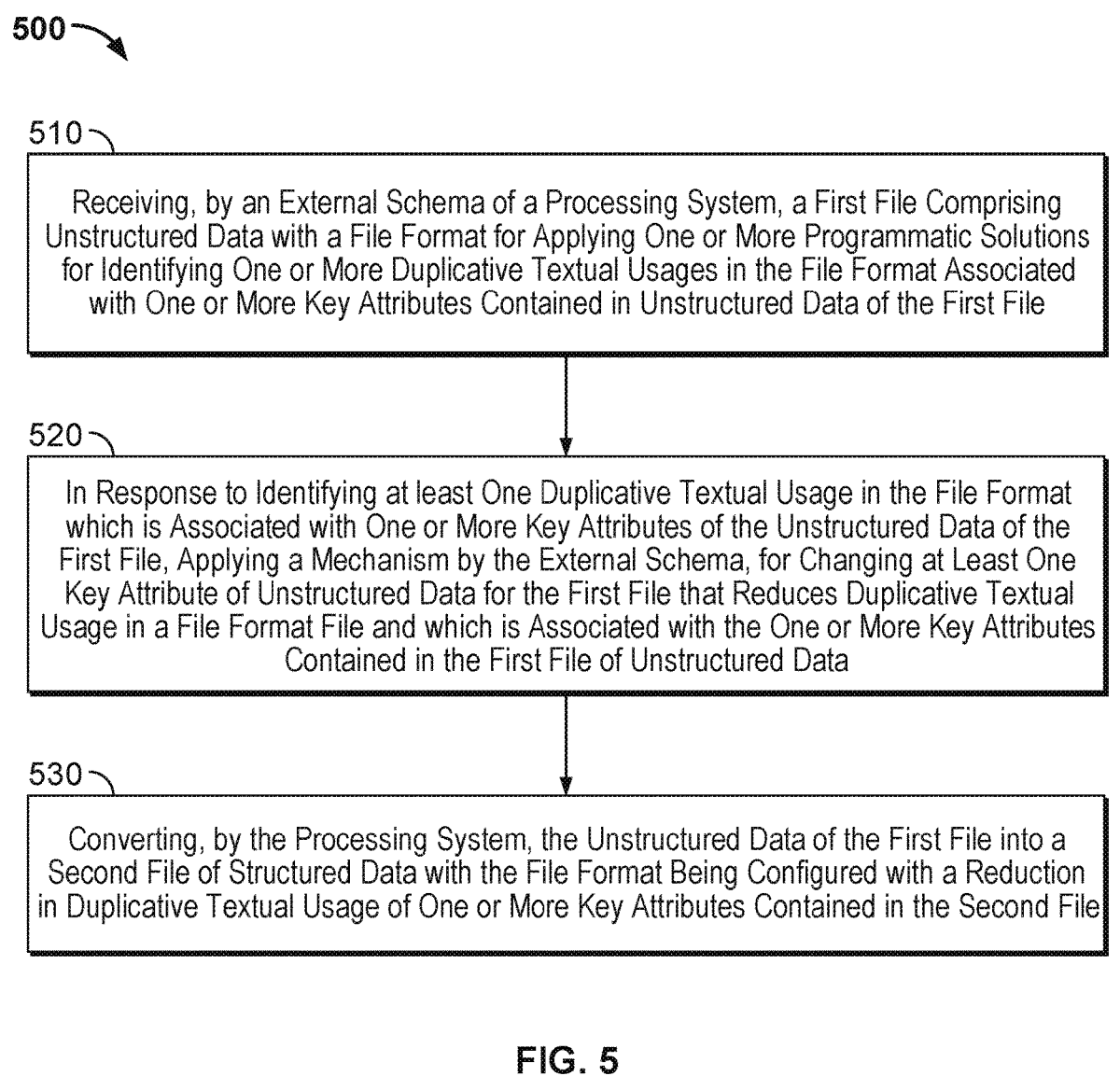

Receiving, by an External Schema of a Processing System, a First File Comprising Unstructured Data with a File Format for Applying One or More Programmatic Solutions for Identifying One or More Duplicative Textual Usages in the File Format Associated with One or More Key Attributes Contained in Unstructured Data of the First File

520

In Response to Identifying at least One Duplicative Textual Usage in the File Format which is Associated with One or More Key Attributes of the Unstructured Data of the First File, Applying a Mechanism by the External Schema, for Changing at Least One Key Attribute of Unstructured Data for the First File that Reduces Duplicative Textual Usage in a File Format File and which is Associated with the One or More Key Attributes Contained in the First File of Unstructured Data

530

Converting, by the Processing System, the Unstructured Data of the First File into a Second File of Structured Data with the File Format Being Configured with a Reduction in Duplicative Textual Usage of One or More Key Attributes Contained in the Second File

FIG. 5

SIMPLIFYING UNSTRUCTURED DATA FOR DATA ANALYTICS

CROSS REFERENCE TO RELATED APPLICATIONS

This application claims priority to and benefit of U.S. Provisional Patent Application Ser. No. 63/620,007, filed on Jan. 11, 2024, the entire contents of which is incorporated herein by reference.

TECHNICAL FIELD

The present disclosure relates to conversions of unstructured data into a structured data file, and more particularly, to identifying and removing duplicate textual data in the unstructured data prior to conversion into the structured data file.

BACKGROUND

Organizations have vast amounts of data, and the process of ingesting and analyzing these large amounts of data must be done efficiently. Structured Query Language (SQL) and Not only SQL (NoSQL) databases organize data and are both used to store big data sets. SQL or NoSQL databases support the horizontal scalability of data sets and can efficiently process large amounts of unstructured data.

JSON (JavaScript Object Notation) is a text-based, human-readable data interchange format used to exchange data between web clients and web servers. The format defines a set of structuring rules for the representation of structured data. JSON is used as an alternative to Extensible Markup Language (XML). In some situations, it may be desirable to receive an unformatted data set containing unstructured data that is to be formatted as a new structured data set of a target or desired file format. Unstructured data in JSON may be written in name and value pairs, similar to JavaScript object properties. A name and value pair are constructed using a name that is placed in double quotes, followed by a colon and a given value.

Because of the pair construction used, it can prove challenging when transferring unstructured data from different sources of different formats and converting it to structured data with a single file format because there is no predetermined schema structure. For example, duplicate data may be found in large JSON object data configured from unstructured data sets, and it can be difficult to find the duplicates in these large JSON objects.

The systems and methods described herein may be directed toward mitigating or overcoming one or more obstacles to converting unstructured data to a more structured data format.

SUMMARY

Described herein is a conversion system configured to automatically convert an input file of unstructured data into a corresponding output file of structured data.

In some aspects, the techniques described herein relate to a computer-implemented method, including: receiving, by a processing system, a first file composed of unstructured data with a first file format; applying, by the processing system, one or more programmatic solutions for identifying one or more duplicate text in the first file format wherein the one or more duplicate text are associated with one or more attributes contained in unstructured data of the first file; identifying, by the processing system, at least one duplicate text contained in the first file wherein duplicate text is associated with at least a first attribute of the unstructured data; in response to identifying at least one duplicate text contained in the first file format, applying, by the processing system, a mechanism for modifying the at least one duplicate text in the first file format to change the first attribute of the unstructured data to a second attribute of a second file format wherein the first attribute is different from the second attribute; and converting, by the processing system, the unstructured data of the first file into a second file of structured data of the second file format composed of the second attribute wherein the second file format is configured with a reduction in duplicate text associated with one or more attributes in a file format.

In some aspects, the techniques described herein relate to a computer system, including: one or more processors; and one or more non-transitory computer-readable media storing computer-executable instructions that, when executed by the one or more processors, cause the one or more processors to perform operations including: receiving a first file composed of unstructured data with a first file format; applying one or more programmatic solutions for identifying one or more duplicate text in the first file format wherein the one or more duplicate text are associated with one or more attributes contained in unstructured data of the first file; identifying at least one duplicate text contained in the first file wherein duplicate text is associated with at least a first attribute of the unstructured data; in response to identifying at least one duplicate text contained in the first file format, applying a mechanism for modifying the at least one duplicate text in the first file format to change the first attribute of the unstructured data to a second attribute of a second file format wherein the first attribute is different from the second attribute; and converting the unstructured data of the first file into a second file of structured data of the second file format composed of the second attribute wherein the second file format is configured with a reduction in duplicate text associated with one or more attributes in a file format.

In some aspects, the techniques described herein relate to one or more non-transitory computer-readable media storing instructions executable by a processor, wherein the instructions, when executed by the processor, cause the processor to perform operations including: receiving a first file composed of unstructured data with a first file format; applying one or more programmatic solutions for identifying one or more duplicate text in the first file format wherein the one or more duplicate text is associated with one or more attributes contained in unstructured data of the first file; identifying at least one duplicate text contained in the first file wherein duplicate text is associated with at least a first attribute of the unstructured data; in response to identifying at least one duplicate text contained in the first file format, applying a mechanism for modifying the at least one duplicate text in the first file format to change the first attribute of the unstructured data to a second attribute of a second file format wherein the first attribute is different from the second attribute; and converting the unstructured data of the first file into a second file of structured data of the second file format composed of the second attribute wherein the second file format is configured with a reduction in duplicate text associated with one or more attributes in a file format.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 shows examples of duplicate column data that is renamed or changed according to some embodiments.

FIG. 3 shows an exemplary report indicating executions of the file processing system for file conversions of received unstructured data according to some embodiments.

FIG. 4 shows a flowchart of an example method for converting an input file that contains the unstructured data stored in a third-party platform, into a structured data file which is formatted according to a desired file format according to some embodiments.

FIG. 5 shows a flowchart illustrating an example method for converting input files into output files that are formatted according to a desired file format according to some embodiments.

DETAILED DESCRIPTION

Figure 1:
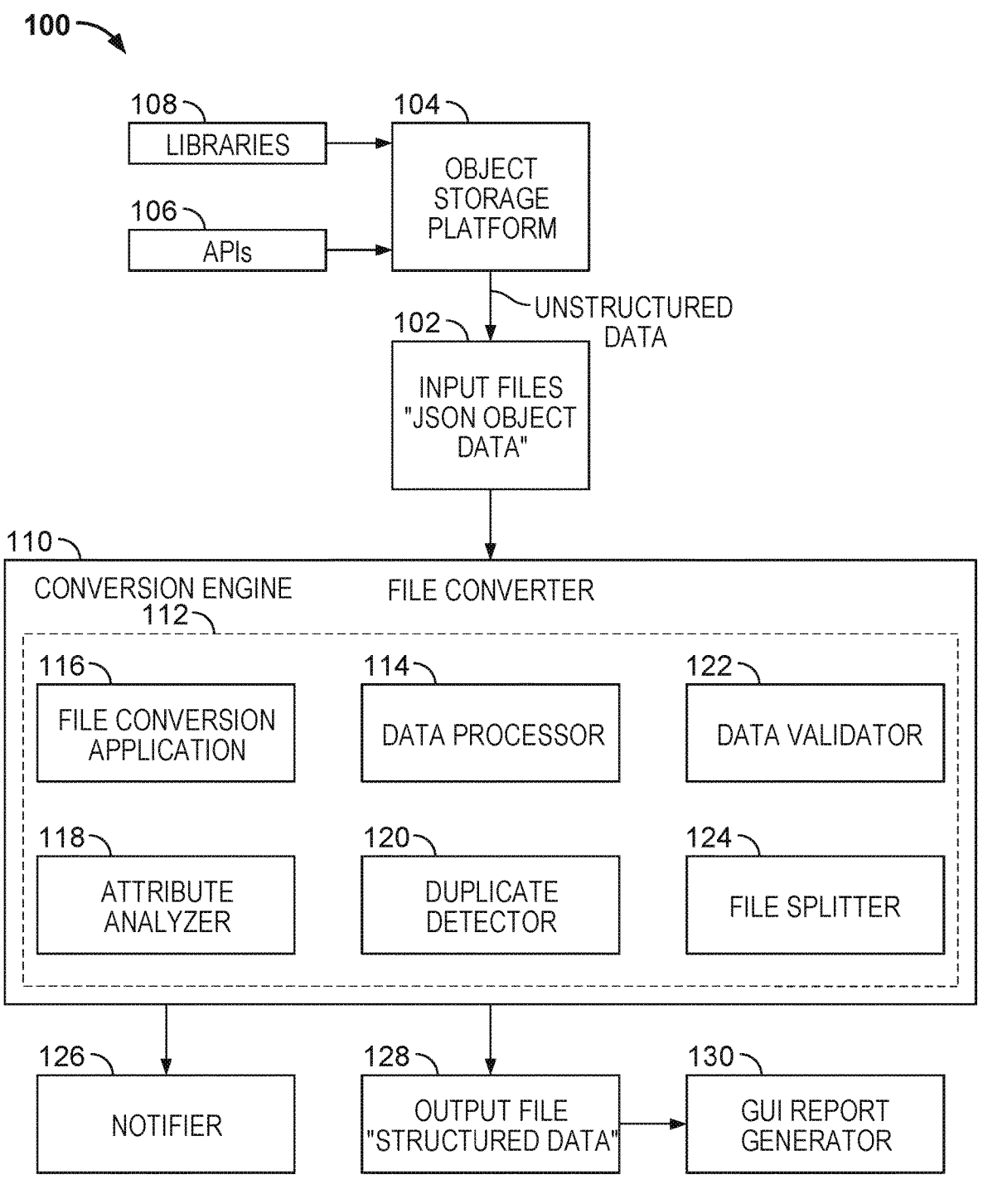
FIG. 1 shows an example file processing system that is configured to receive, as input, unstructured data that can be composed of a variety of different formats for conversion to a desired structured file format according to some embodiments.

FIG. 1 shows an example file processing system 100 that is configured to receive, as input, unstructured data that can be composed or formed of a variety of different unstructured type formats for conversion to a desired structured file data format. For example, an input file 102 may comprise a JSON object (i.e., file format) composed of unstructured data that is stored and then fetched from a storage location at object storage platform 104. In some embodiments, the object storage platform 104 is configured to store the input file 102 which may include one or more unstructured data objects and may be configured to enable linking to multiple APIs or libraries to provision (or to perform other processes) and also make more efficient, the processing by the file processing system 100 of the unstructured data (i.e., JSON object data) contained in the input file 102 or other files of unstructured data types. In some embodiments, the object storage platform 104 may be a cloud-type platform that is located at a remote enterprise network that allows the file processing system 100 to call multiple APIs or linked libraries installed at the object storage platform 104 for use in initially provisioning and processing of a JSON object or other unstructured data object.

In some embodiments, an AMAZON® object storage platform such as AMAZON® S3 may be used to store one or more data objects such as the JSON object that contains the unstructured data and may also be linked to one or more APIs (or other open-source applications) 106 that may be also configured at the object storage platform 104. As an example, the example file processing system 100 may be configured to execute one or more scripts for processing the data object at the object storage platform 104 for object storage and that is being executed by one or more scripts of the example file processing system 100. For example, one or more open-source applications (or APIs 106) are initially executed at an onboarding stage by one or more script executions by the file processing system 100. Also, one or more libraries 108 may be linked in the object storage platform 104 (i.e., a third-party platform) with other applications and/or APIs to process the unstructured object data of the JSON object of one or more input files 102. For example, a set of libraries 108 may be imported with the object storage platform 104 to define a context for the JSON object on the object storage platform 104 and to configure a set of variables used in defining parts of the JSON object. In some instances, multiple parts or sub-objects may be defined of the JSON object composed of the unstructured data and each sub-object may have one or more attributes that are used to create a structure for the data of the JSON object (i.e., to create a structure type with attributes for each data object). For example, a structure type may be used to store structured data in CSV files at the output in a configured output file 128.

The JSON object file (i.e., the input file 102) may then be received by a file converter 110 that includes a conversion engine 112 that performs any number of operations including applying a file conversion application 116, a data processing application (via a data processor 114), an attribute analyzer application (via an attribute analyzer 118), a duplicate detection application (via a duplicate detector 120), a data validation application (via a data validator 122), and a file splitter application (via a file splitter 124).

In some embodiments, the file conversion application 116 executes one or more processing scripts to convert the JSON object file to a data frame. The processing script of the file conversion application 116 may convert the data of the JSON object into a dynamic frame for a more structured and relationship-based representation of the unstructured data contained in the JSON object.

In some embodiments, the processing script may execute a set of functions to create columns and dynamic frames from the JSON object to reformat the unstructured data. For example, the file conversion application 116 processing script may create a CSV file that can be parsed by the structure type object. The processing script may also be used to define a window object to create a window of data of the unstructured data contained in the JSON object for analysis.

In some embodiments, the file conversion application 116 may include executing one or more scripts to convert the JSON object files over various periods with parameters that define start and end times. The JSON object files that are converted may be configured in rows in a matrix that is numbered and with columns that define ways in which the data is to be split into structured parts for the file conversion. In some embodiments, the processing script may be designed to create a window function that will return the row number of the current row to create an input JSON object file with a new Data Frame corresponding to the year, month, and day as columns or may create a dynamically framed object. For example, a dynamic frame object may be used to create a temporary table that can be queried against without concern for schema changes or other issues related to the script or schemas to be executed.

In some embodiments, the unstructured data of the JSON object may be further processed by the data processor 114. The data processor 114 processing script may be configured to construct a schema processing type pipeline using an open-source unified analytics engine for large-scale data processing (e.g., APACHE® SPARK® or other big data analytics). In instances, the schema may create and manipulate Spark Data Frames and perform some data processing tasks of the received data set. In instances, the code or schema may be split into two parts, one part being a string and the other part being an integer. The string may be used to create a new file in the S3 storage bucket with the name table name +'/'+ table name + '.csv'. For example, the string part may enable replacing the 's3://' file name (of the input file 102) with "so that there is no need for any special characters when uploading the file to the S3 storage bucket. It also replaces 's3://' with" on both sides of the bucket name so that there are no extra spaces or anything else that might cause problems later on during processing and finally, it appends '/table name/table name'.

In some embodiments, the unstructured data of the JSON object is further processed by the attribute analyzer 118 that includes code, for example, Python code (or other open-source code) that uses the Apache Spark framework to process and analyze one or more JSON input attributes of the JSON object data. The code may perform several comparison operations of various JSON attributes found in the data. Further, the code maybe configured to perform one or more operations of extracting JSON keys from the data frame schema, creating a sequence ID for the JSON keys, defining a current JSON schema, creating data frames for the current JSON schema, registering a temporary table, counting JSON attributes, applying an SQL query to find additional attributes, executing the SQL queries, generating a list of new key names, checking for no new keys, creating a data frame for new keys, and displaying the new keys in the data frame.

In some embodiments, the code may be configured to read JSON keys from a Data Frame schema, compare the JSON keys with another set of keys, process the differences, and generate new key names for the additional attributes found in the current JSON. The code may also be configured within an APACHE SPARK® framework for distributed data processing.

In some embodiments, the attribute analyzer 118 may update or rename column names and return a list of renamed column names. The attribute analyzer 118 may include code to process the various transformations on JSON data stored in Data Frames, rename columns, apply data type conversions, and write the resulting Data Frame. For example, a function: df_current_json dfc select (dfc_name).toDF( ) and current_json_keys=df_current_json.schema.names may be used to build or update a schema template file and to return a list of renamed column names. The function may be configured to also manage the schema of the JSON data. For example, the code may apply the function and then construct an output partition path based on a provided set of configuration parameters and data information obtained from the code by managing an ETL (Extract, Transform, Load) process for a JSON data set using a set of tools composed of APACHE SPARK®.

In some embodiments, the unstructured data of the JSON object may be further processed by a duplicate detector 120. The duplicate detector 120 may include code to enable blanking operations of the data set to blank duplicate names used in a set of current JSON keys; if any duplication of the data is discovered as the data is being processed. The duplicate detector 120 may be configured to include code to manipulate the JSON keys in the data frame. For example, the code blanks may be configured as duplicate names in current JSON keys if duplicate names exist and are discovered. In some embodiments, the blank duplicate names in current JSON keys may already be assigned to historical JSON keys, and, in this case, the duplicate detector 120 merges and updates the historical JSON keys. In some embodiments, the duplicate detector 120 may include code to rename JSON keys and to manage duplicates in a distributed data processing environment using an APACHE SPARK® framework (shown in FIG. 2).

In some embodiments, the data may be further processed by the data validator 122. The data validator 122 may be configured to identify and manage duplicates in JSON keys and also to perform a validation check on the processed data. For example, the data validator 122 may include code to apply SQL queries and data frame operations to process the data to discover the number of unique names in a given JSON key. For example, the code may include steps for executing an SQL query that uses CTEs (Common Table Expressions) to identify and manage duplicates in a JSON structure. In instances, if in the querying operation, blank or whitespace is discovered in the data set, a message is printed indicating that there are duplicate unique names in the JSON structure that need manual correction.

In some embodiment, the script is configured to proceed to process the resulting Data Frame iteratively through the rows and to append the values in a Data Frame to a list named. The script may also check if the whitespace character is present in the current schema rename list. If it is, it uses this result as an indication that there are duplicate columns with empty unique rename values.

The output of the conversion engine 112 is configured to convert JSON objects containing unstructured data to data objects in JSON or CSV in a structured data format.

In some embodiments, the conversion engine 112 can be a computer-implemented system that is configured to execute via one or more scripts, applications, and/or other elements on one or more computing systems. As a non-limiting example, the conversion engine 112 can execute on a computing system via a shell script and/or a Python script that processes data via a PySpark computing framework.

In some embodiments, the file processing system 100 executes the conversion engine 112 using a single computing device, multiple computing devices, and/or other computing elements such as one or more processors, microprocessors, servers, etc. As an example, the conversion engine 112 may be executed locally on one or more computing devices that locally store and/or access the object storage platform 104. As another example, the conversion engine 112 may be executed remotely via one or more cloud computing elements, remote servers, and/or one or more other computing elements that can remotely store the input file 102.

In some examples, the conversion engine 112 may be executed via parallel processing via one or more computing systems, for instance, to convert different input files 102 at substantially the same time using different threads. Accordingly, if a user wants to convert the set of input files 102 quickly, the user may choose to execute the conversion engine 112 or different instances of the conversion engine 112 via multiple cloud computing servers and/or via multithreading on a single computing device, such that the conversion engine 112 can convert multiple input files 102 at substantially the same time. However, if there is less concern about a timeframe and a desire to reduce costs, the conversion of the set of input files 102 can be configured to occur at a lower cost and/or using a lower amount of computing reinputs over a longer period; the user, for example, to lower costs can choose to execute the conversion engine 112 via a single thread and/or a single computing device.

In some embodiments, the conversion engine 112 may be executed as a managed service on or within a computing environment managed by an entity, such that the conversion engine 112 can convert files associated with that entity or that is provided to the entity by one or more partners. In other examples, the conversion engine 112 may be linked to one or more partners of the entity, such that the partners can execute one or more instances of the conversion engine 112 in computing environments managed by the partners.

As described above, the output file 128 may be formatted according to one or more desired file structured data formats. For example, the input files 102 may include unstructured data that is found in files of fixed-length files and/or variable-length files, text files, .dat files, .out files, mainframe files, Apache Parquet files, and/or files of other file formats. The file formats of the input file 102 can be considered to be input file formats, which may be different from the output file format into which the input file 102 is to be converted.

In some examples, an output file 128 may be configured as a delimited file, such as a CSV file or a TSV file, which indicates values in one or more fields associated with one or more records or entries. For instance, an input file 102 can store a two-dimensional array or table of data that includes rows that represent individual records, and columns that store values for one or more fields of each record. As another example, an input file 102 may be configured as a JSON file, XML file, or other type of file that stores data associated with records in attribute-value pairs (AVPs), which may include nested AVPs.

In some embodiments, the file convertor 110 may include configuration data that can indicate a file format of the structured data for the output file 128. In other examples, the file format can be set to any other file format, such as the CSV file format, the TSV file format, the JSON file format, the XML file format, or any other file format. The conversion engine 112 can be configured, as described herein, to convert input files 102 which are not formatted and contain unstructured data to one or more structured file formats in the output files 128.

Although in some examples, the input files 102 and/or output files 128 can express information associated with records or other entries as described above, in other examples the input files 102 and/or output files 128 can express document data, image data, video data, audio data, and/or any other type of data. For example, the input file 102 can include image files of one or more image file formats, and the conversion engine 112 can convert the image files into output files 128 that are formatted based on an image file format.

Different file converters of the file converter 110 can be configured to convert files of different corresponding input files of unstructured data of various formats into the output file format for the structured data.

In some examples, the file converter 110 can be integrated with the conversion engine 112. In other examples, the file converter 110 can be separate programs or computing elements but can be invoked by the conversion engine 112 to convert input files 102 of corresponding file formats into output files 128 formatted according to a desired file format.

In some examples, the data validator 122 can be used to validate the conversion and/or other elements of the conversion engine 112 and may output user alerts and/or maintain one or more logs, such as error logs or logs of successful operations. For example, if output files 128 do not have the same number of values, and/or other elements as were present in corresponding input files 102 or that are indicated by separate control files, the data validator 122 may generate errors, output the errors to other systems or destinations, display the errors in a user interface associated with the conversion engine 112, and/or log the errors in an error log. Similarly, if the data validator 122 may generate, output, display, and/or log an error indicating that not all of the output files 128 were successfully converted.

In some embodiments, the conversion engine 112 can include a file splitter 124 that is configured to divide individual input file 102 into smaller component files that can be separately converted by the file converter 110. For example, the file splitter 124 can be configured to divide an input file 102 of unstructured data if the size of the input file 102 is larger than the file size threshold indicated by the configuration data. The file splitter 124 can divide the unstructured data input file 102 into smaller component files that may have sizes that are less than or equal to the file size threshold. The sizes of different component files may be equal or different.

In some embodiments, the conversion engine 112 can include a notifier 126. The notifier 126 can be configured to generate and/or send a notification to one or more destinations. The notifier 126 can indicate that conversion operations associated with set input files 102 are complete (as shown in FIG. 3), indicate any errors that occurred during such conversion operations, indicate status information associated with the conversion operations, and/or express any other information associated with the conversion operations.

The notifier 126 sends data to a graphical user interface report generator 130 that includes a preview of records or other data expressed in the output file 128 converted from the input file 102. For example, if the output file 128 includes rows associated with a set of records, the notifier 126 may extract a subset of the rows and include the subset of the rows in the notification. Accordingly, a user who views the notification can see what types of data are expressed in the output file 128.

After receiving the input file 102 of the unstructured data composed of a number of unstructured formats for conversion, the example file processing system 100 outputs the output file 128 which is a structured data file as an output of the file converter 110 of a desired structured file data format using one or more exemplary described components of the file conversion engine 112 which include the file conversion application 116, the data processor 114, the attribute analyzer 118, the duplicate detector 120, the data validator 122, and the file splitter 124.

FIG. 2 illustrates examples of a file in which the duplicate column data of an input file has been renamed or changed according to some embodiments. In FIG. 2 there is a shown a duplicate schema of data 200 of the input file 102 that has been processed by the conversion engine 112. JSON keys have been checked in individual columns 202 of the JSON object by the duplicate detector 120. If a duplicate column data has been identified, then the column data is renamed with a unique column name 204.

FIG. 3 shows an exemplary report generated by the graphical user interface (GUI) report generator 130 of the file processing system of executions of the file processing system for file conversions of received unstructured data files according to some embodiments. Report 300 provides user information about the run status of various file conversions by the processing system 100. Report 300 displays to the user one or more different metrics associated with the execution of one or more conversion operations of the file processing system 100. For example, in each row 302, there is shown one or more labels and descriptive information indicative of successful or not successful execution of conversion of unstructured data contained in the input file 102 and metrics associated with the conversion process of the input file 102 to an output file 128 of structured data. Also, displayed in the report generated, in report 300 in the graphical user interface (GUI), are particular metrics tied to the processing of the input file including execution actions such as the start and end times, duration, capacity, worker type, and glue version. This provides a user with insight into amounts of unstructured data contained in the input file 102, and resources used to perform various executions to complete a file conversion process of unstructured data to a structured output file 128.

FIG. 4 illustrates a flowchart of an example method 400 for the example file processing system 100 for converting input file 102 that contains the unstructured data which is stored in the object storage platform 104 (i.e., a platform configured for storing the JSON object data) into an output file 128 that is converted to a structured data which is formatted according to a desired file format. Method 400 shown in FIG. 4 can be performed by elements of the conversion engine 112 executing via one or more computing systems. While the example method 400 shows a particular order of operations performed by certain implementations, such order is exemplary and not limiting (e.g., alternative implementations may perform the operations in a different order, combine certain operations, perform certain operations in parallel, etc.).

At block 402, the processing system 100 can fetch a JSON object of unstructured data from an object storage platform 104 used for storing the unstructured object data and select (as preconfigured or user-selected on the object storage platform 104) various linked multiple APIs or libraries to provision and also make more efficient processing of the JSON object data in the input files 102 or other files that are composed of unstructured data types. In some embodiments, the object storage platform 104 may be a cloud platform that is located at a remote enterprise network, and that allows the file processing system 100 to call multiple API or linked libraries installed at the object storage platform 104 for use in initial provisioning and processing of the JSON object or other unstructured data object.

At block 404, the file convertor 110 can receive the input file 102 containing the unstructured data. In some embodiments, one or more input files 102 may contain one or more objects of unstructured data that are amalgamated or aggregated together by the file processing system 100 or at the file convertor 110 for processing a combined set of unstructured data into a structured file of a desired format.

At block 406, the conversion engine 112 performs any number of operations (as may be preconfigured by the user on the object storage platform 104 or automatically provisioned using various intelligent solutions) including applying a file conversion application 116, a data processing application (data processor 114), an attribute analyzer application (attribute analyze 118), a duplicate detection application (duplicate detector 120), a data validation application (data validator 122), and a file splitter 124.

At block 408, the conversion engine 112 may via the file conversion application 116 execute one or more processing scripts to convert the JSON object file to a data frame. The processing script may convert the data of the JSON object into a dynamic frame for a more structured and relationship representation of the unstructured data contained in the JSON object. In some embodiments, the processing script may execute a set of functions to create columns and dynamic frames from the JSON object to reformat the unstructured data. For example, the file conversion application 116 creates a CSV file that can be parsed by the structure type object. The processing script may also be used to define a window object to create a window of data of the unstructured data contained in the JSON object for analysis. The JSON object data may be configured in rows in a matrix that is numbered and with columns that define ways to how the data is to be split into structured parts. In some embodiments, the processing script may be designed to create a window function that will return the row number of the current row to create an input JSON object file with a new Data Frame corresponding to the year, month, and day as columns or may create a dynamically framed object. For example, a dynamic frame object may be used to create a temporary table that can be queried against without concern for schema changes or other issues related to the script or schemas to be executed.

At block 410, the conversion engine 112 may via the data processor 114 construct a schema processing type pipeline using an open-source unified analytics engine for large-scale data processing (e.g., APACHE® SPARK® or other big data analytics). In instances, the schema may create and manipulate Spark Data Frames and perform some data processing tasks of the received data set. The code may split that key into two parts, one being a string and the other being an integer. The string may be used to create a new file in the S3 storage bucket with the name table name +'/'+ table name+ '.csv'. Next, it replaces 's3://' with "so that there is no need for any special characters when uploading this file to S3. It also replaces 's3://' with" on both sides of the bucket name so that there are no extra spaces or anything else that might cause problems later on during processing. Finally, it appends '/table name/table name'.

At block 412, the conversion engine 112 may apply various processes via the attribute analyzer 118 including code, for example, Python code (or other open-source code) that uses the Apache Spark framework to process and analyze one or more JSON input attributes of the JSON object data. The code may be programmed to perform several comparison operations of various JSON attributes found in the data. Further, the code may be programmed to perform one or more operations of extracting JSON keys from the data frame schema, creating a sequence ID for the JSON keys, defining a current JSON schema, creating data frames for the current JSON schema, registering a temporary table, counting JSON attributes, SQL query to find additional attributes, executing the SQL queries, generating a list of new key names, checking for no new keys, creating a data frame for new keys, and displaying the new keys in the data frame.

At block 414, the conversion engine 112 may via duplication detector (duplicate detector 120) include code to enable blanking operations to the data set such as to blank duplicate names used in a set of current JSON keys if any duplications are discovered as the data is processed. The duplication detector (duplicate detector 120) may be configured to include code to manipulate the JSON keys in the data frame. For example, the code blanks may be configured to duplicate names in current JSON keys if duplicate names exist and are discovered. In some embodiments, the blank duplicate names in current JSON keys may already be assigned to historical JSON keys, and, in this case, the duplicate detector 120 merges and updates historical JSON keys. In some embodiments, the duplicate detector 120 may include code to rename JSON keys and to manage duplicates in a distributed data processing environment using an APACHE SPARK® framework.

At block 416, the conversion engine 112 via the data validator 122 may be configured to identify and manage duplicates in JSON keys and also to perform a validation check on the processed data. For example, the data validator 122 may include code to apply SQL queries and data frame operations to process the data to discover the number of unique names in a given JSON key. For example, the code may include steps for executing an SQL query that uses CTEs (Common Table Expressions) to identify and manage duplicates in a JSON structure. In instances, if in the querying operation, blank or whitespace is discovered in the data set, a message is printed indicating that there are duplicate unique names in the JSON structure that need manual correction. The script proceeds to process the resulting Data Frame iteratively through the rows and appends the values to a list named. The script checks if the whitespace character is present in the current schema rename list. If it is, it uses this result as an indication that there are duplicate columns with empty unique rename values.

At block 418, the conversion engine 112 applying various scripts programmed in the attribute analyzer 118 may update or rename column names and return a list of renamed column names. The attribute analyzer 118 may include code to process the various transformations on JSON data stored in Data Frames, rename columns, apply data type conversions, and write the resulting Data Frame. For example, a function: df_current_json=dfc select (dfc_name).toDF( ) and current_json_keys=df_current_json.schema.names may be used that can build or update a schema template file and returns a list of renamed column names. This function can also involve managing the schema of the JSON data. The code may be programmed to then construct an output partition path based on the provided configuration parameters and the date information obtained from the code. purpose of the code seems to be managing the ETL (Extract, Transform, Load) process for JSON data using Apache Spark and related tools. The output of the conversion engine 112 is configured to convert JSON objects containing unstructured data to data objects in JSON or CSV in a structured data format.

At block 420, the conversion engine 112 via the file splitter 124 may reduce the size of the output file 128 by splitting the file or performing other functions to delimit the file, such as creating a CSV file or a TSV file, which indicates values in one or more fields associated with one or more records or entries. For instance, an input file 102 can store a two-dimensional array or table of data that includes rows that represent individual records, and columns that store values for one or more fields of each record. As another example, an input file 102 can be a JSON file, XML file, or other type of file that stores data associated with records in attribute-value pairs (AVPs), which may include nested AVPs.

At block 422, the file converter 150 includes configuration data that can indicate a file format of the structured data for the output file 128. In other examples, the file format can be set to any other file format, such as the CSV file format, the TSV file format, the JSON file format, the XML file format, or any other file format. The conversion engine 112 can be configured, as described herein, to convert input files 102 which are not formatted and contain unstructured data to one or more structured file formats in the output files 128.

Additionally, if the conversion operations are complete, the conversion engine 112 can also output a corresponding notification at block 424. For example, the conversion engine 112 can send a notification via the notifier 126 to one or more destinations indicated in the configuration data and/or display the notification via a graphical user interface report generator 130 to notify one or more users that the conversion operations are complete. The notification may indicate logged errors, if any, that occurred during the method 400. In some examples, notifications can include a preview of a subset of records extracted from the output files.

FIG. 5 is a flowchart 500 of an example method for receiving and processing a JSON object of unstructured data and its conversion to a structured file format according to some embodiments. In FIG. 5, a computer-implemented method comprises executing an external schema to implement the following steps. At step 510, receiving, by an external schema of a processing system, a first file comprising unstructured data with a file format for applying one or more programmatic solutions for identifying one or more duplicative textual usages in the file format associated with one or more key attributes contained in unstructured data of the first file. At step 520, in response to identifying at least one duplicative textual usage in the file format which is associated with one or more key attributes of the unstructured data of the first file, applying a mechanism by the external schema, for changing at least one key attribute of unstructured data for the first file that reduces duplicative textual usage in a file format file and which is associated with the one or more key attributes contained in the first file of unstructured data. At step 530, converting, by the processing system, the unstructured data of the first file into a second file of structured data with the file format being configured with a reduction in duplicative textual usage of one or more key attributes contained in the second file.

Figure 6:
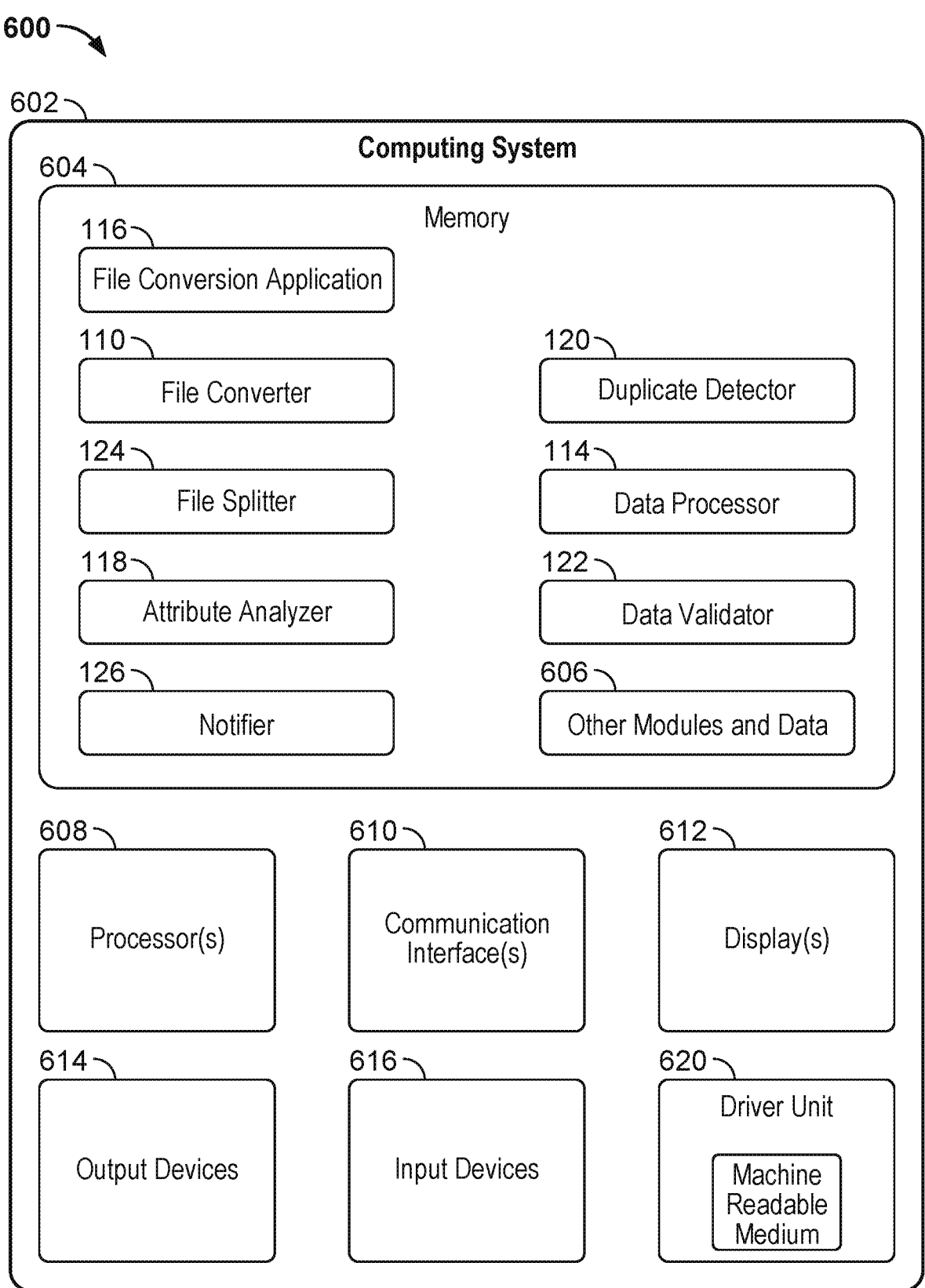
FIG. 6 shows an example system architecture for a computing system that can execute the conversion engine according to some embodiments.

FIG. 6 shows an example system architecture 600 for a computing system 602 that includes the file converter 110 that can execute one or more elements of the conversion engine 112 described herein. The computing system 602 can include one or more servers, computers, computing systems, or other types of computing devices that execute one or more portions of the conversion engine 112, such as the file conversion application 116, the data processing application (data processor 114), the attribute analyzer application (attribute analyzer 118), the duplicate detection application (duplicate detector 120), the data validator application (data validator 122), and the file splitter 124. Also, the computing system 602 can send the formatted output file 128 with notifications generated from the notifier 126 and reports via the graphical user interface report generator 130. Individual computing devices of the computing system 602 may have the system architecture 600 shown in FIG. 6 or a similar system architecture.

In some examples, elements of the file converter 150 including the conversion engine 112 can be distributed among, and/or be executed by, multiple computing devices similar to the computing device shown in FIG. 6. For example, the file converter 150 may execute on one or more different computing devices. Additionally, in some examples, different instances of one or more elements of the conversion engine 112 (shown in FIG. 1) can be executed by different computing devices, and/or by the same computing device via multithreading or other parallel processing techniques. In some examples, one or more elements of the conversion engine 112 can be executed by one or more elements of a cloud computing environment or other distributed system, such as a cloud computing environment that hosts and/or executes one or more elements associated with the conversion engine 112, instances of a file converter 150, and/or other elements described herein.

The computing system 602 can include memory 604. In various examples, the memory 604 can include system memory, which may be volatile (such as RAM), non-volatile (such as ROM, flash memory, etc.), or some combination of the two. The Memory 604 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 602 associated with the conversion engine 112. Any such non-transitory computer-readable media may be part of the computing system 602.

The memory 604 can store modules and data. The modules and data can include data and/or software or firmware elements, such as data and/or computer-readable instructions that are executable by one or more processors 608. For example, memory 604 can store computer-executable instructions and data associated with the conversion engine 112, such as data and/or computer-executable instructions associated with the file converter 150 and the configuration data, and/or other elements described herein. The memory 604 can also store other modules and data 606, such as any other modules and/or data that can be utilized by the computing system 602 to perform or enable performing any action taken by the computing system 602. Such other modules and data 606 can include a platform, operating system, and applications, and data utilized by the platform, operating system, and applications.

The computing system 602 can also have processor(s) 608, communication interfaces 610, a display 612, output devices 614, input devices 616, and/or a drive unit 620 including a machine-readable medium.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections. In some examples, the communication interface 610 can be used by the conversion engine 112 to locate and/or retrieve input files 102, transfer output files 128, transmit notifications, or otherwise send and/or receive data.

The display 612 can be a liquid crystal display, or any other type of display commonly used in computing devices. For example, a display 612 may be a touch-sensitive display screen and can then also function as an input device or keypad, such as for providing a soft-key keyboard, navigation buttons, or any other type of input.

The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable medium of the drive unit 620 can store one or more sets of instructions, such as software or firmware, which embody any one or more of the methodologies or functions described herein. The instructions can also reside, completely or at least partially, within the memory 604, processor(s) 608, and/or communication interface(s) 610 during execution thereof by the computing system 602. The memory 604 and the processor(s) 608 also can constitute machine-readable media.

Clause 1. A computer-implemented method, comprising: receiving, by a processing system, a first file composed of unstructured data with a first file format; applying, by the processing system, one or more programmatic solutions for identifying one or more duplicate text in the first file format wherein the one or more duplicate text are associated with one or more attributes contained in unstructured data of the first file; identifying, by the processing system, at least one duplicate text contained in the first file wherein duplicate text is associated with at least a first attribute of the unstructured data; in response to identifying at least one duplicate text contained in the first file format, applying, by the processing system, a mechanism for modifying the at least one duplicate text in the first file format to change the first attribute of the unstructured data to a second attribute of a second file format wherein the first attribute is different from the second attribute; and converting, by the processing system, the unstructured data of the first file into a second file of structured data of the second file format composed of the second attribute wherein the second file format is configured with a reduction in duplicate text associated with one or more attributes in a file format.

Clause 2. The computer-implemented method of clause 1, wherein identifying the duplicate text comprises identifying a difference between a first textual label associated with the first attribute from column data in the first file format and a second textual label associated with the second attribute from column data in the second file format.

Clause 3. The computer-implemented method of clause 2, further comprising: removing, by the processing system, duplicate text in the column data of the first file format from the column data of the second file format such that the second file format is configured with a reduction in column data.

Clause 4. The computer-implemented method of clause 3, further comprising: reducing, by the processing system, the column data of the first file format that contains unstructured data using a data frame function and converting the first file format into a second file of structured data, the second file is characterized by flattening of the column data.

Clause 5. The computer-implemented method of clause 4, further comprising: determining, by the processing system, one or more instances of duplicate text in column data; and based on determining of one or more instances of duplicate text in column data, validating, by the processing system, removal of the duplicate text of column data in the second file format from the first file format.

Clause 6. The computer-implemented method of clause 3, further comprising: querying, by the processing system, column data of each column of the first file format of the unstructured data; based on querying of the column data, identifying, by the processing system, at least one duplicate textual usage in the column data of the first file format; and applying, by the processing system, a blanking action for removal of at least one duplicate text in the column data that has been identified by the querying of column data of the first file format of the unstructured data of the first file.

Clause 7. The computer-implemented method of clause 6, further comprising: querying, by the processing system, column data of each column of the second file format of the structured data; based on querying of the column data, identifying, by the processing system, at least one duplicate text in the column data of the second file format; and applying, by the processing system, another blanking action for removal of at least one duplicative text in the column data of the second file format that has been identified by the querying of column data of the second file format of the structured data of the second file.

Clause 8. The computer-implemented method of clause 7, further comprising: renaming, by the processing system, one or more labels associated with column data of the second file format of the structured data of the second file to configure one or more new labels associated with the second file format of the structured data of the second file based on one or more comparisons of column data of each column of the first file format of the first file of unstructured data to column data of the second file format of the second file of the structured data wherein the one or more new labels are indicative of structured data contained in the second file.

Clause 9. A computer system, comprising: one or more processors; and one or more non-transitory computer-readable media storing computer-executable instructions that, when executed by the one or more processors, cause the one or more processors to perform operations comprising: receiving a first file composed of unstructured data with a first file format; applying one or more programmatic solutions for identifying one or more duplicate text in the first file format wherein the one or more duplicate text are associated with one or more attributes contained in unstructured data of the first file; identifying at least one duplicate text contained in the first file wherein duplicate text is associated with at least a first attribute of the unstructured data; in response to identifying at least one duplicate text contained in the first file format, applying a mechanism for modifying the at least one duplicate text in the first file format to change the first attribute of the unstructured data to a second attribute of a second file format wherein the first attribute is different from the second attribute; and converting the unstructured data of the first file into a second file of structured data of the second file format composed of the second attribute wherein the second file format is configured with a reduction in duplicate text associated with one or more attributes in a file format.

Clause 10. The computer system of clause 9, wherein identifying the duplicate text comprises identifying a difference between a first textual label associated with the first attribute from column data in the first file format and a second textual label associated with the second attribute from column data in the second file format.

Clause 11. The computer system of clause 10, wherein the operations performed by the one or more processors further comprises: removing duplicate text in the column data of the first file format from the column data of the second file format such that the second file format is configured with a reduction in column data.

Clause 12. The computer system of clause 11, wherein the operations performed by the one or more processors further comprises: reducing the column data of the first file format that contains unstructured data using a data frame function and converting the first file format into a second file of structured data, the second file being characterized by flattening of the column data.

Clause 13. The computer system of clause 12, wherein the operations performed by the one or more processors further comprises: determining one or more instances of duplicate text in column data; and based on determining of one or more instances of duplicate text in column data, validating removal of the duplicate text of column data in the second file format from the first file format.

Clause 14. The computer system of clause 13, wherein the operations performed by the one or more processors further comprises: querying column data of each column of the first file format of the unstructured data; based on querying of the column data, identifying, at least one duplicate textual usage in the column data of the first file format; and applying a blanking action for removal of at least one duplicate text in the column data that has been identified by the querying of column data of the first file format of the unstructured data of a first file.

Clause 15. The computer system of clause 14, wherein the operations performed by the one or more processors further comprises: querying column data of each column of the second file format of the structured data; based on querying of the column data, identifying at least one duplicate text in the column data of the second file format; and applying another blanking action for removal of at least one duplicative text in the column data of the second file format that has been identified by the querying of column data of the second file format of the structured data of the second file.

Clause 16. The computer system of clause 15, wherein the operations performed by the one or more processors further comprises: renaming one or more labels associated with column data of the second file format of the structured data of the second file to configure one or more new labels associated with the second file format of the structured data of the second file based on one or more comparisons of column data of each column of the first file format of the first file of unstructured data to column data of the second file format of the second file of the structured data wherein the one or more new labels are indicative of structured data contained in the second file.

Clause 17. One or more non-transitory computer-readable media storing instructions executable by a processor, wherein the instructions, when executed by the processor, cause the processor to perform operations comprising: receiving a first file composed of unstructured data with a first file format; applying one or more programmatic solutions for identifying one or more duplicate text in the first file format wherein the one or more duplicate text is associated with one or more attributes contained in unstructured data of the first file; identifying at least one duplicate text contained in the first file wherein duplicate text is associated with at least a first attribute of the unstructured data; in response to identifying at least one duplicate text contained in the first file format, applying a mechanism for modifying the at least one duplicate text in the first file format to change the first attribute of the unstructured data to a second attribute of a second file format wherein the first attribute is different from the second attribute; and converting the unstructured data of the first file into a second file of structured data of the second file format composed of the second attribute wherein the second file format is configured with a reduction in duplicate text associated with one or more attributes in a file format.

Clause 18. The non-transitory computer-readable media of clause 17, wherein identifying the duplicate text comprises identifying a difference between a first textual label associated with the first attribute from column data in the first file format and a second textual label associated with the second attribute from column data in the second file format.

Clause 19. The non-transitory computer-readable media of clause 18, the operations further comprising: removing duplicate text in the column data of the first file format from the column data of the second file format such that the second file format is configured with a reduction in column data.

Clause 20. The non-transitory computer-readable media of clause 19, the operations further comprising: reducing the column data of the first file format that contains unstructured data using a data frame function and converting the first file format into a second file of structured data, the second file being characterized by flattening of the column data. Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
receiving, by a computing system, a first data file formatted based on a first file format, the first data file comprising unstructured data that indicates attribute-value pairs (AVPs);
converting, by the computing system, the unstructured data from the first data file into a dynamic data frame by:
using a window function to generate a window of data returned from the unstructured data; and
reformatting the unstructured data, within the window of data, into a structured representation that includes columns named with respective attribute names of the AVPs;
identifying, by the computing system, that a first name of a first column and a second name of a second column of the dynamic data frame share a duplicate attribute name;
in response to identifying that the first name and the second name share the duplicate attribute name:
using, by the computing system, a blanking operation to blank the second name of the second column in the dynamic data frame; and
modifying, by the computing system, and based on a query that identifies blank or whitespace in the second name in response to the blanking operation, the second name of the second column to a second attribute name that is different from the duplicate attribute name; and
converting, by the computing system, and based on the dynamic data frame, the unstructured data of the first data file into a second data file, wherein:
the second data file comprises structured data formatted based on a second file format,
the second data file comprises a value associated with the second attribute name, and the second file format is characterized by a reduction in duplicate attribute names relative to the first file format.

2. The computer-implemented method of claim 1, further comprising:
validating, by the computing system, that modifying the second name of the second column to the second attribute name has removed the duplicate attribute name.

3. The computer-implemented method of claim 1, wherein the first data file is a JavaScript Object Notation (JSON) object, and the respective attribute names of the AVPs are JSON keys.

4. The computer-implemented method of claim 1, further comprising:
determining, by the computing system, that a size of the first data file exceeds a threshold;
splitting, by the computing processing-system, the first data file into a plurality of component data files; and
separately converting, by the computing system, the plurality of component data files into the second file format.

5. The computer-implemented method of claim 1, wherein the computing system receives the first data file from a storage platform separate from the computing system.

6. The computer-implemented method of claim 5, wherein the storage platform comprises cloud storage remote from the computing system.

7. The computer-implemented method of claim 1, wherein:
the window function defines a particular timeframe, and
the window of data comprises data, returned from the unstructured data, that corresponds to the particular timeframe.

8. The computer-implemented method of claim 1, further comprising causing, by the computing system, a graphical user interface to present a report indicating that the duplicate attribute name was identified.

9. The computer-implemented method of claim 1, further comprising executing, by the computing system, the query, wherein the query is configured to identify the blank or whitespace added, via instances of the blanking operation, to column names of the dynamic data frame.

10. The computer-implemented method of claim 9, further comprising:
generating, by the computing system, and in response to executing the query, an indication that the second name of the second column was, prior to the blanking operation, the duplicate attribute name; and
determining by the computing system, and in response to the indication, the second attribute name to which the second name of the second column is to be modified.

11. A computer system, comprising:
one or more processors; and
one or more non-transitory computer-readable media storing computer-executable instructions that, when executed by the one or more processors, cause the one or more processors to perform operations comprising:
receiving a first data file formatted based on a first file format, the first data file comprising unstructured data that indicates attribute-value pairs (AVPs);
converting the unstructured data from the first data file into a dynamic data frame by:
using a window function to generate a window of data returned from the unstructured data; and reformatting the unstructured data, indicated by the window of data, into a structured representation that includes columns named with respective attribute names of the AVPs;

identifying that a first name of a first column and a second name of a second column of the dynamic data frame share a duplicate attribute name;

in response to identifying that the first name and the second name share the duplicate attribute name:

using a blanking operation to blank the second name of the second column in the dynamic data frame; and modifying, based on a query that identifies blank or whitespace in the second name in response to the blanking operation, the second name of the second column to a second attribute name that is different from the duplicate attribute name; and converting, based on the dynamic data frame, the unstructured data of the first data file into a second data file, wherein:

the second data file comprises structured data formatted based on a second file format.

12. The computer system of claim 11, wherein:

modifying the second name to the second attribute name, different from the duplicate attribute name, causes a reduction in a number of duplicate attribute names in the second data file relative to the first data file.

13. The computer system of claim 11, wherein the operations performed by the one or more processors further comprises:

validating that modifying the second name of the second column has removed the duplicate attribute name.

14. The computer system of claim 11, wherein the first data file is a JavaScript Object Notation (JSON) object, and the respective attribute names of the AVPs are JSON keys.

15. The computer system of claim 11, wherein the operations further comprise:

determining that a size of the first data file exceeds a threshold;

splitting the first data file into a plurality of component data files; and separately converting the plurality of component data files into the second file format.

16. One or more non-transitory computer-readable media storing instructions executable by a processor, wherein the instructions, when executed by the processor, cause the processor to perform operations comprising:

receiving a first data file formatted based on a first file format, the first data file comprising unstructured data that indicates attribute-value pairs (AVPs);

converting the unstructured data from the first data file into a dynamic data frame by:

using a window function to generate a window of data returned from the unstructured data; and reformatting the unstructured data, indicated by the window of data, into a structured representation that includes columns named with respective attribute names of the AVPs;

identifying that a first name of a first column and a second name of a second column of the dynamic data frame share a duplicate attribute name;

in response to identifying that the first name and the second name share the duplicate attribute name:

using a blanking operation to blank the second name of the second column in the dynamic data frame; and modifying, based on a query that identifies blank or whitespace in the second name in response to the blanking operation, the second name of the second column to a second attribute name that is different from the duplicate attribute name; and converting, based on the dynamic data frame, the unstructured data of the first data file into a second data file, wherein:

the second data file comprises structured data formatted based on a second file format.

17. The one or more non-transitory computer-readable media of claim 16, wherein:

modifying the second name to the second attribute name, different from the duplicate attribute name, causes a reduction in a number of duplicate attribute names in the second data file relative to the first data file.

18. The one or more non-transitory computer-readable media of claim 16, wherein the operations further comprise validating that modifying the second name of the second column has removed the duplicate attribute name.

19. The one or more non-transitory computer-readable media of claim 16, wherein the first data file is a JavaScript Object Notation (JSON) object, and the respective attribute names of the AVPs are JSON keys.

20. The one or more non-transitory computer-readable media of claim 16, wherein the operations further comprise:

determining that a size of the first data file exceeds a threshold;

splitting the first data file into a plurality of component data files; and separately converting the plurality of component data files into the second file format.

* * * * *